United States Patent [19]
Clark et al.

[11] 3,820,608
[45] June 28, 1974

[54] COMBINATION HARVESTING AND SALVAGING HEADER FOR PEANUT COMBINES

[76] Inventors: George W. Clark, Rt. 1, Box 121; Nathan E. Winslow, Jr., 1729 N. Church St., both of Scotland Neck, N.C. 27874

[22] Filed: July 24, 1972

[21] Appl. No.: 274,463

[52] U.S. Cl. .................. 171/26, 171/1, 56/DIG. 12
[51] Int. Cl. ............................................. A01f 9/00
[58] Field of Search .............. 171/1, 13, 26, 27, 40, 171/41, 42, 43, 111, 124, 126, 137, 139, 44; 56/DIG. 8, DIG. 12

[56] References Cited
UNITED STATES PATENTS

| | | | |
|---|---|---|---|
| 919,342 | 4/1909 | Gettelmann | 171/26 |
| 1,255,275 | 2/1918 | Barnett et al. | 56/DIG. 12 |
| 1,288,541 | 12/1918 | Fant | 171/44 |
| 1,440,168 | 12/1922 | O'Donnell | 171/41 |
| 1,771,447 | 7/1930 | Rice | 171/13 |
| 2,220,240 | 11/1940 | Hazel | 171/27 |
| 2,288,985 | 7/1942 | Zuckerman | 171/1 |

*Primary Examiner*—Antonio F. Guida
*Attorney, Agent, or Firm*—Mills and Coats

[57] ABSTRACT

In abstract, a preferred embodiment of the present invention comprises a header for a peanut combine that is particularly adapted to harvest peanuts and the associated crop material above ground, or to salvage loose peanuts left on the ground after the above ground harvesting operation. In particular, the peanut header of the present invention comprises a main frame, a separator-conveyor associated with the header and operatively connected to the combine for conveying peanuts and crop material thereto, and a rotary harvesting mechanism disposed forwardly of the separator-conveyor for engaging and guiding the peanuts and associated crop material onto the separator-conveyor. To modify the header of the present invention to salvage loose peanuts from the ground, the rotary harvesting mechanism may be modified to include a plurality of ground engaging sweeping elements that are operative to engage the loose peanuts disposed on the ground and sweep them into the header, thereby salvaging the peanuts lost during the above ground harvesting operation. Alternatively, the header may be provided with a relatively narrow, transverse blade gauged to penetrate and lift a thin layer of soil and the loose peanuts lying thereon onto the separator-conveyor.

4 Claims, 9 Drawing Figures

COMBINATION HARVESTING AND SALVAGING HEADER FOR PEANUT COMBINES

BACKGROUND OF THE INVENTION

The present invention relates to agricultural machinery, and more particularly to a peanut crop harvesting header for a peanut combine.

In the past, the conventional method of harvesting peanuts has included, first, the step of digging the peanuts and other underground plant material (roots, etc.) from the ground and leaving such along with the above ground crop material (vines, leaves, etc.) on the ground for drying. After the peanuts and associated crop material has dried, a peanut combine is then employed to move through the field and pick up the peanuts and crop material, and by a threshing operation the peanut combine separates the peanuts from the above ground crop material and roots.

In order to efficiently combine the peanuts, it is necessary that the above ground peanut crop material be relatively dry. When the harvesting season is accompanied by damp, humid and rainy weather the harvesting season is naturally extended, and in some cases where this type of weather persists over a substantial period of time, it even becomes difficult to harvest the peanut crop at all. One result of such damp, humid and rainy weather is that the peanuts over a period of time tend to separate from the other peanut crop material and consequently are left lying on the ground in loose form. When lying loose on the ground, the peanuts are not harvestable by a conventional combine because in conventional peanut harvesting the harvester is simply designed to pick up the entire peanut plant and all loose peanuts are passed over. Moreover, even in the best conditions the reel of the conventional peanut combine tends to beat and jar the peanuts from the remaining portion of the peanut crop material. Thus, it is not uncommon for a significant, or even in some cases substantial, portion of the total peanut crop to be left lying on the ground in loose form, and the peanut farmer without any efficient means to salvage or capture this lost portion of the crop.

SUMMARY OF THE INVENTION

After much research and study into the above mentioned problems, the present invention has been developed to provide a harvesting and salvaging header for peanut combines that enables the peanut farmer to harvest peanuts and associated crop material above the ground, and, also, enables the same farmer to convert the header to perform a salvaging operation in which the individual peanuts lying on the ground in loose form are engaged and moved into the header, thereby enabling the farmer to harvest substantially all of the peanut crop.

Also disclosed is a novel method and apparatus for harvesting peanuts that avoids the above mentioned problems present in conventional peanut harvesting. In particular, the novel method of harvesting peanuts disclosed herein entails the cutting of the above ground peanut crop material and the harvesting thereof prior to actually harvesting the underground peanuts. After the above ground crop material is harvested, the method suggests removing an upper layer of soil which includes the peanuts and separating the removed layer of soil from the peanuts therein. By providing an apparatus to carry out this basic method approach to harvesting peanuts, the peanut farmer no longer has to time the final harvesting operation relative to the dryness of the above ground crop material. Moreover, after the above ground crop material has been harvested, he may simply dig and harvest the peanuts in one single field operation at his convenience since the final maturity of the peanuts is established at the time of cutting the above ground crop material.

It is, therefore, an object of the present invention to provide a header for a peanut combine that is operative in one mode to harvest peanuts and associated crop material above the ground, and is further operative in another mode to pick up and salvage peanuts lost in the above ground harvesting operation.

Another object of the present invention is to provide a header for a peanut combine that can be conveniently coverted from an above ground harvesting unit to a salvaging unit.

A further object of the present invention resides in the provision of a header for a peanut combine which includes a rotary salvaging unit disposed forwardly in the header and adapted to engage the ground with a sweeping action, thereby sweeping the loose peanuts disposed on the ground into the combine header.

An even further object of the present invention is to provide the header with a novel frame arrangement for carrying the rotary salvaging unit such that the unit may float and follow the contour of the ground as the header and combine traverse the field during the harvesting operation.

An additional object of the present invention is to provide a novel method and apparatus for harvesting peanuts in a two-phase operation, the first phase being cutting the above ground peanut crop material and harvesting that material, and the second phase being digging and removing the peanuts in one single operation, thereby actually harvesting the peanuts without having to separate the peanuts from the above ground crop material by the conventional thrashing operation customarily performed by the peanut combine.

With respect to the preceding object, it is a further object of the present invention to provide an apparatus in the form of a peanut combine header which actually removes a layer of soil from the ground with the peanuts contained therein, and further separate the layer of soil from the peanuts during the single field harvesting operation.

Another object of the present invention is to provide a header for a peanut combine that is adapted to perform an underground salvaging operation, the header being provided with blade means that may be selectively gauged to slightly penetrate the top soil of the ground and to peel a thin layer therefrom, and to receive the layer on a separator-conveyor, whereby the thin layer of soil is separated from the peanuts loosely supported thereon.

Other objects and advantages of the invention will become apparent and obvious from a study of the following description and the accompanying drawings which are merely illustrative of the present invention.

DESCRIPTION OF THE PREFERRED EMBODIMENT

From the foregoing discussion of the prior art and the present invention, it is apparent that it provides a header for a peanut combine that may be adapted to perform (1) direct underground harvesting, (2) above ground harvesting, and (3) both above ground and underground salvaging. Since the basic structure of the header remains relatively unchanged, the specification will first deal with describing the basic structure of the header.

Figure 1:
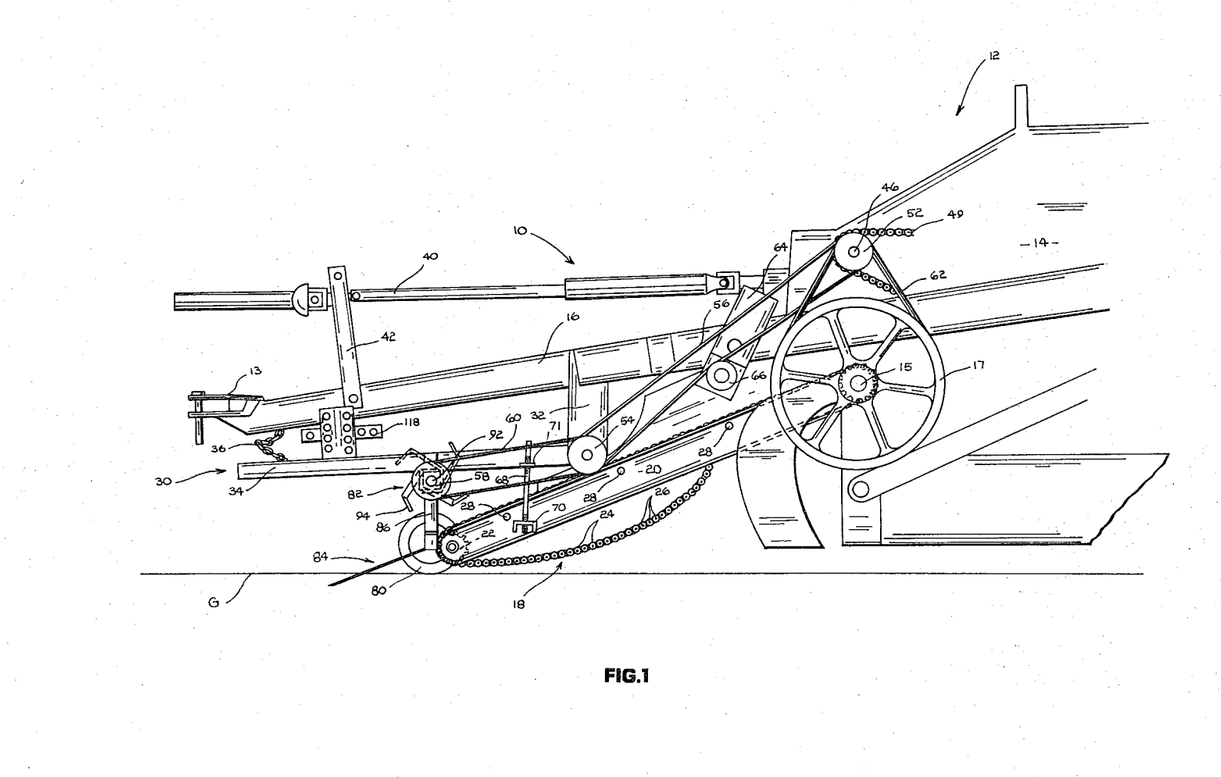
FIG. 1 is a side elevational view of the direct underground harvesting header of the present invention, the header, as shown, being mounted to the front of a conventional peanut combine.
Figure 4:
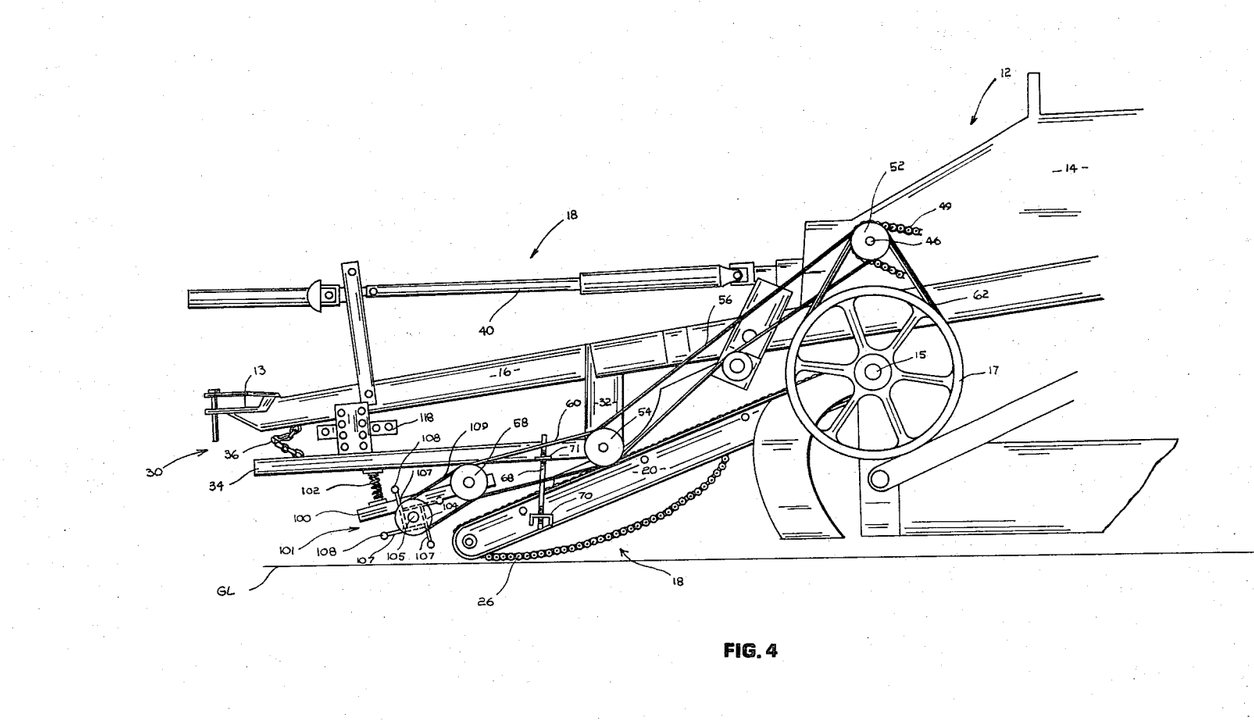
FIG. 4 is a side elevational view of the convertible header shown in FIG. 3.

With further reference to the drawings, particularly FIGS. 1 and 4, a convertible header is shown therein and indicated generally by the numeral 10. The header shown herein is designed to accommodate two rows, but it is obvious that by varying the width of the header and its associated components, more or less rows may be accommodated. The header 10, as shown in the drawings, is adapted to mount on the front portion of a conventional peanut combine 12, the combine including a side wall structure 14 on each side thereof which serves to partially house the various components of the combine which are not shown herein in detail as they do not materially relate to the present invention.

Referring to the header in detail, it will be observed that a main frame 16 extends generally fore-and-aft relative to the front portion of the combine and that the main frame includes a front clevis 13 for connecting the main frame to a conventional tractor (not shown) in order that the header and combine may be towed across the field. Rotatably mounted about a rear transverse portion of the header 10 is a drive shaft 15 which includes a drive wheel 17 fixedly secured on one end thereof. The drive shaft 15 serves to pivotably support a separator-conveyor 18 that extends generally forwardly and downwardly therefrom where a front terminal end thereof is normally disposed in close proximity to the ground G being traversed by the header 10 and combine 12.

Figure 3:
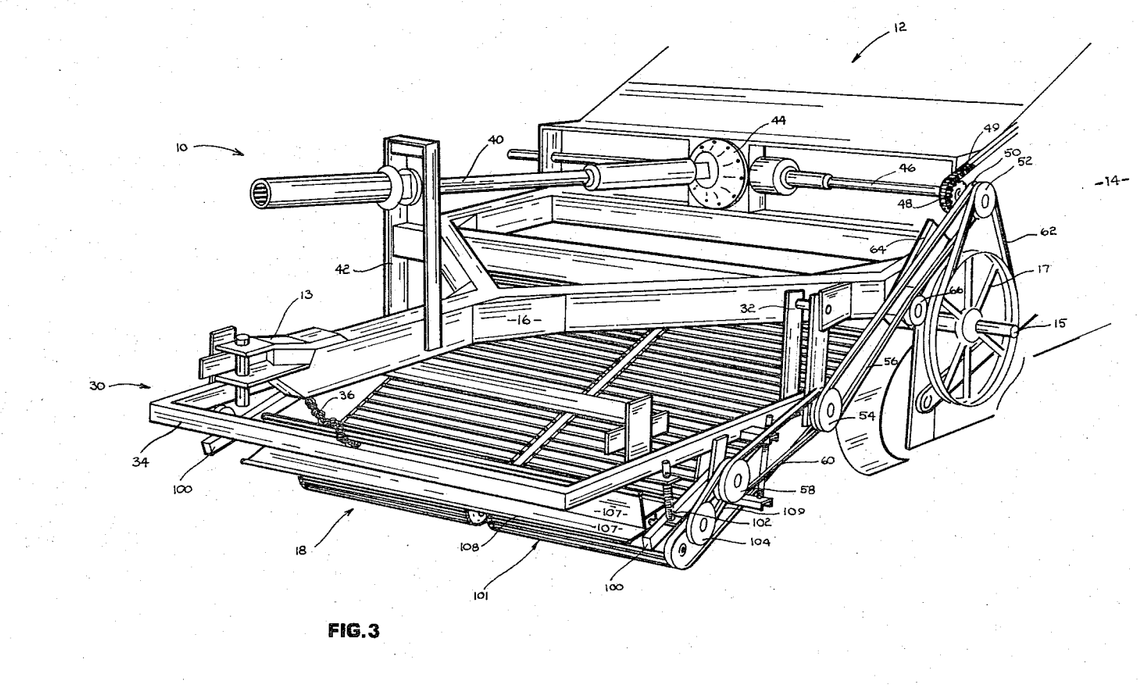
FIG. 3 is a front perspective view of the combination harvesting and salvaging convertible header of the present invention, the header being particularly adapted for above ground harvesting.

The separator-conveyor 18 of the present disclosure comprises two sections disposed in side by side relationship as seen clearly in FIG. 3, each section being adapted to accommodate a single row of the two-row header 10. With respect to the individual sections of the separator-conveyor 18, each section is pivotably supported about drive shaft 15 and includes a pair of laterally spaced apart side frames 20. These side frames 20 include front and rear sprockets 22 that have respective chains 24 trained therearound, said sprockets 22 and chains 24 being driven by transverse drive shaft 15.

Extending transversely between respective chain links of the chains 24 of each section are a plurality of rods 26, the rods being closely spaced in order that the peanuts will not normally fall therethrough but that the soil and other small debris will fall therethrough and consequently be separated from the peanuts. To facilitate separation, the side frames 20 are provided with a plurality of spaced apart rollers 28 about the upper edge thereof for engaging the chain and imparting a rippling action thereto.

Depending downwardly from the main frame 16 is a subframe indicated generally at 30; such subframe comprising a pair of laterally spaced, downwardly projecting arms 32 and a forwardly projecting yoke frame 34 pivotably mounted to the lower portions of the arms 32 and extending generally forwardly therefrom. The downward movement of the yoke 34 is limited by a chain 36 interconnecting a forward portion thereof with the underside of the main frame 16.

Turning to a description of the drive system, it is seen that a PTO drive shaft 40 extends fore-and-aft above the header 10 and passes through a support 42 extending upwardly from the main frame 16. The forward end of the drive shaft 40 is adapted to be driven by a tractor (not shown) and the rear end is operatively connected to a right angle gear box 44 which has a primary drive shaft 46 extending outwardly therefrom toward one side of the header 10 and combine 12. Fixed to the primary drive shaft 46 is a drive sprocket 48 and a pair of sheaves or pulleys 50 and 52. The drive sprocket 48 has trained therearound a chain 49 which is operative to drive the various components of the combine (not shown).

The driving torque of the primary drive shaft 46 is transferred to a pair of pulleys or sheaves 54 and 58 rotatively mounted on one side of the subframe 30 by a series of drive belts 56 and 60. In particular, drive belt 56 is trained around the intermost pulley 50 and trained around one side of pulley 54 (pulley 54 being a double pulley). The double pulley arrangement 54 transfers the torque thereof to the forward most pulley 58 by the drive belt 60. As will become more evident from the foregoing discussion, the driving torque applied to sheave or pulley 58 from the primary drive shaft 46 will be used to drive any one of several harvesting and salvaging rotary mechanisms that can be disposed transversely of the header 10.

To maintain the proper tension on the intermediate drive belt 56, an idler mount 64 is pivotably mounted to the main frame 16 and includes a rotatively mounted pulley 66 thereon that is aligned with the belt 56 and particularly adapted to engage and maintain a selected tension thereon.

As previously noted, it is desirable to maintain the front terminal end of the separator-conveyor 18 in close proximity to the ground G. Moreover, it is also desirable to maintain the separator-conveyor 18 in a selected position relative to the subframe 30 as the header and combine traverse the ground. To accomplish this end, a hold rod 68 extends upwardly from a lift block 70 fixed to a respective side frame 20 of the separator-conveyor 18. The upper end of the hold rod 68 is received in an adjustable nut 71, or other suitable adjustable securing means, disposed on subframe 30. Thus, by adjusting the position of the hold rod 68 within the nut 71 of the subframe 30, it follows that the distance between the separator-conveyor 18 and the subframe 30 may be adjusted for the particular operation being performed by the header 10. Also, by making the same adjustment, the position of the separator-conveyor 18 with respect to the ground G can likewise be properly adjusted.

The foregoing description has described a header for use with a peanut combine. The basic structure of the header just described may be used to (1) to directly harvest the peanuts underground in one single field operation, (2) to harvest peanuts and associated above ground crop material (commonly referred to as above ground harvesting), and (3) to salvage peanuts lost during the above ground harvesting. One particular aspect of the present invention lies in the provision of a convertible header that in one mode of operation may be used to harvest above ground, and in another mode of operation may be converted to salvage the peanuts lost during the above ground harvesting.

With respect to the convertible aspect of the header presently disclosed, one is first referred to FIGS. 3 and 4 which show the convertible header particularly adapted for above ground harvesting. Viewing the details of the above ground harvesting adaptation, it will be observed that a pair of laterally spaced support arms 100 are pivotably mounted to the subframe 30 and project forwardly therefrom. The support arms 100 are biased downwardly by a spring assembly 102 extending between the arms 100 and the forwardly projecting yoke 34.

The basic reel assembly 101, as shown in FIGS. 3 and 4, comprises a transversely extending shaft 105 rotatively mounted between arms 100. Shaft 105 has a rectangular sleeve 106 secured therearound. Extending radially from such rectangular sleeve is a series of circumferentially spaced paddles 107 that extend transversely the length of the basic reel. Secured to the outer edge of each paddle 107 by weldment, or other suitable means, is a tubular pipe 108 that likewise extends substantially the length of the basic reel structure.

In order to drive the basic reel, a drive sheave 104 is secured to one end of shaft 105 and the driving torque applied to sheave 58 is transferred to sheave 104 and consequently to the basic reel structure by a drive belt 109, such drive belt being trained around the spaced apart sheaves 104 and 58.

As best seen in FIG. 4, the basic reel structure or rotary assembly of the above ground harvesting adaptation is disposed just forwardly and slightly above the front terminal end of the separator-conveyor 18. In operation, this particular adaptation is used to traverse a peanut field and to pick up peanuts and the entire associated crop material lying on the ground. The basic reel structure 101 shown in FIG. 4 is continually driven as the header and combine move through the field, the reel functioning to engage and generally move the entire peanut plant from the ground up onto the separator-conveyor 18. This basic reel structure is quite advantageous in that it does not beat and jar the peanuts loose from the roots of the peanut crop material, and consequently the loss of peanuts is minimized.

As previously pointed out, even in the best conditions peanuts may be separated from the roots of the peanut plant during above ground harvesting, said consequently assume a loose form on the ground, and thereby cannot be harvested by conventional above ground harvesting machines. To harvest the total crop of peanuts, the header 10 shown herein is convertible to a salvaging unit that is particularly adapted to pick up and capture these peanuts lost during above ground harvesting, or those peanuts which are separated from the peanut plant during long periods of damp humid weather.

Figure 5:
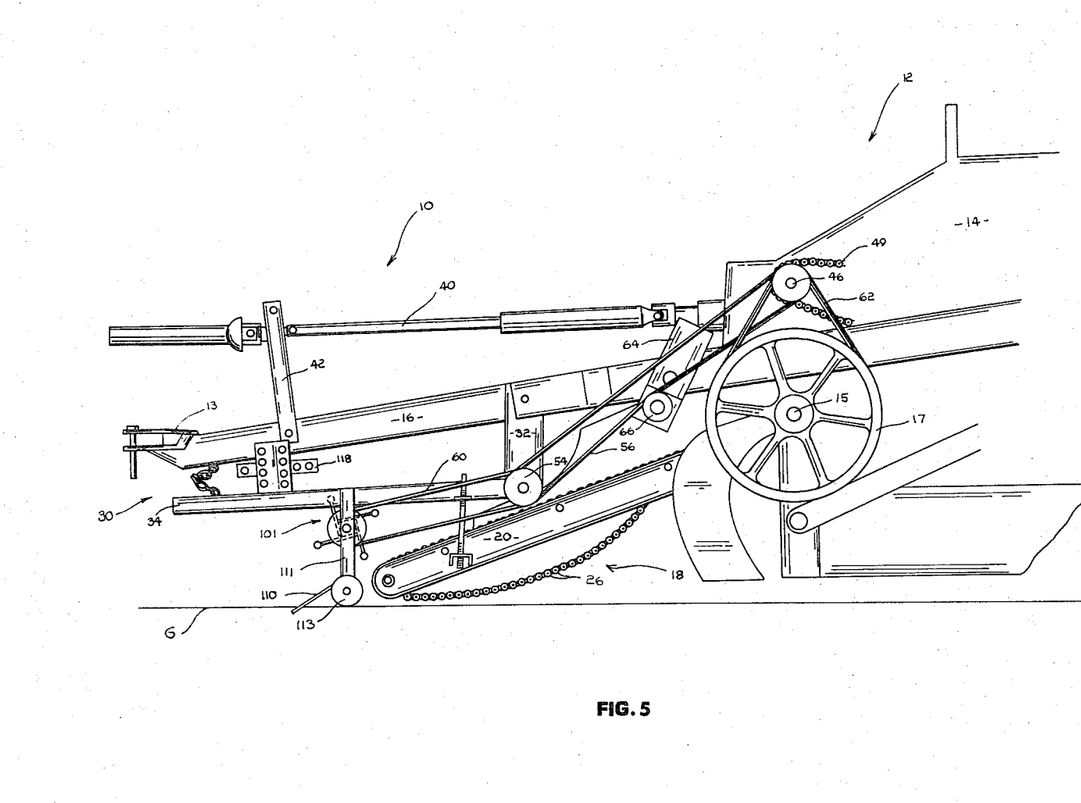
FIG. 5 is a side elevational view of the same basic convertible header with the header being particularly adapted for shallow underground salvaging.
Figure 6:
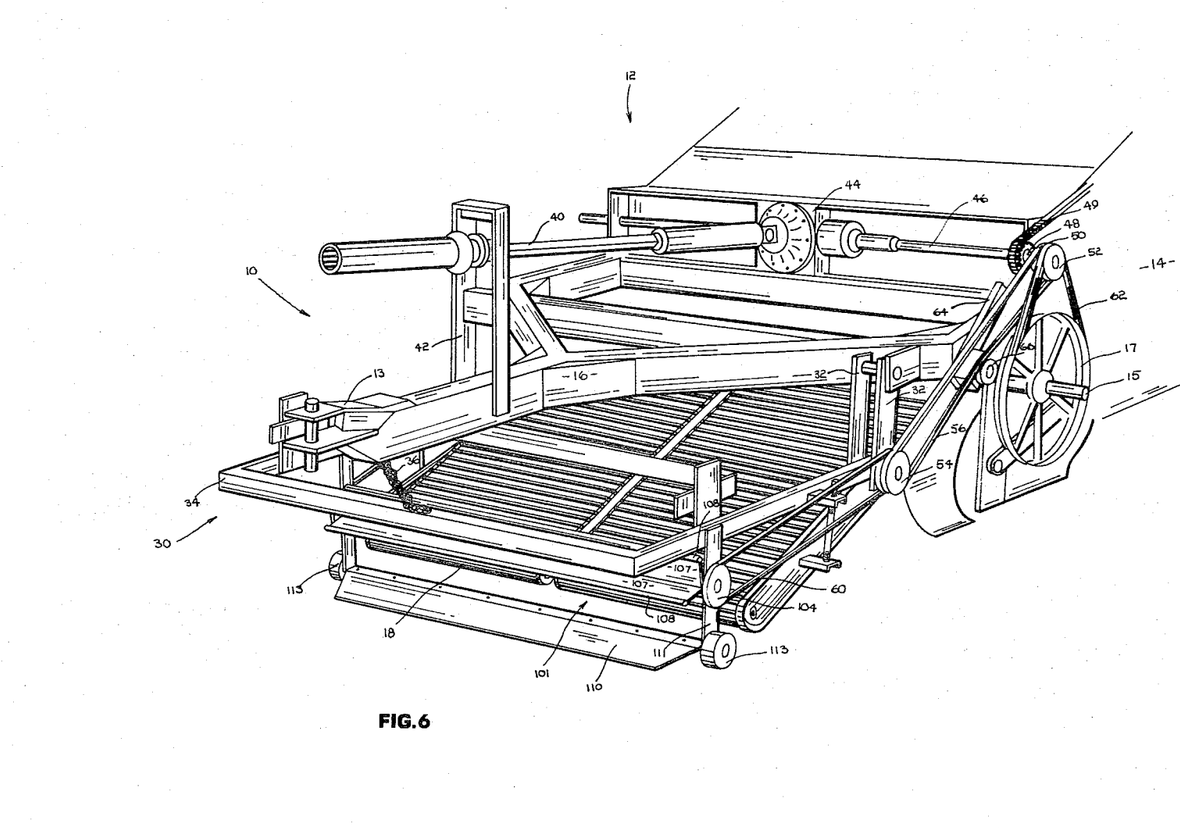
FIG. 6 is a front perspective view of the shallow underground salvaging embodiment of the convertible header shown in FIG. 5.

The first salvaging embodiment to be discussed herein is that shown in FIGS. 5 and 6 which will be termed "shallow underground salvaging". With respect to the shallow underground salvaging embodiment, it will be seen that the basic reel structure 101 (FIGS. 3 and 4) of the above ground harvesting embodiment is kept intact. The addition comprises a U-shaped blade frame 111 that is disposed below the subframe 30 and carried thereby. Rotatively mounted on each side of the blade frame 111 is a ground engaging roller 113, the roller particularly provided to gauge the depth of penetration of a transverse blade 110 that is mounted on the lower portion of the blade frame 111. The transverse blade 110 is angle slightly downwardly for penetrating to a shallow depth in the soil (approximately 1 inch) such that as the header moves through the field, the blade 110 tends to peel a thin layer of soil from the ground and guide the layer onto the rearwardly disposed separator-conveyor 18. It, of course, follows that any peanuts loosely disposed in or on the thin layer of soil peeled from the ground will be carried back onto the separator-conveyor 18 and separated from the soil.

Figure 7:
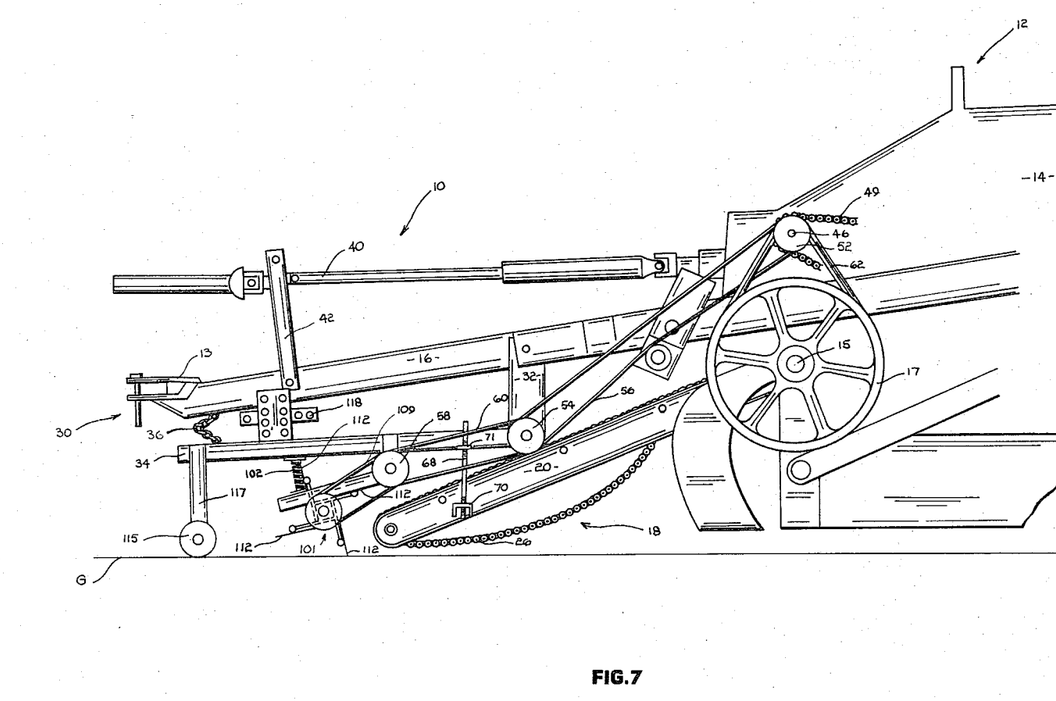
FIG. 7 is a side elevational view of the basic convertible header particularly adapted therein for above ground salvaging, and specifically provided with a rotary tine assembly and a hood disposed thereabove for guiding the peanuts toward the rear of the header.
Figure 8:
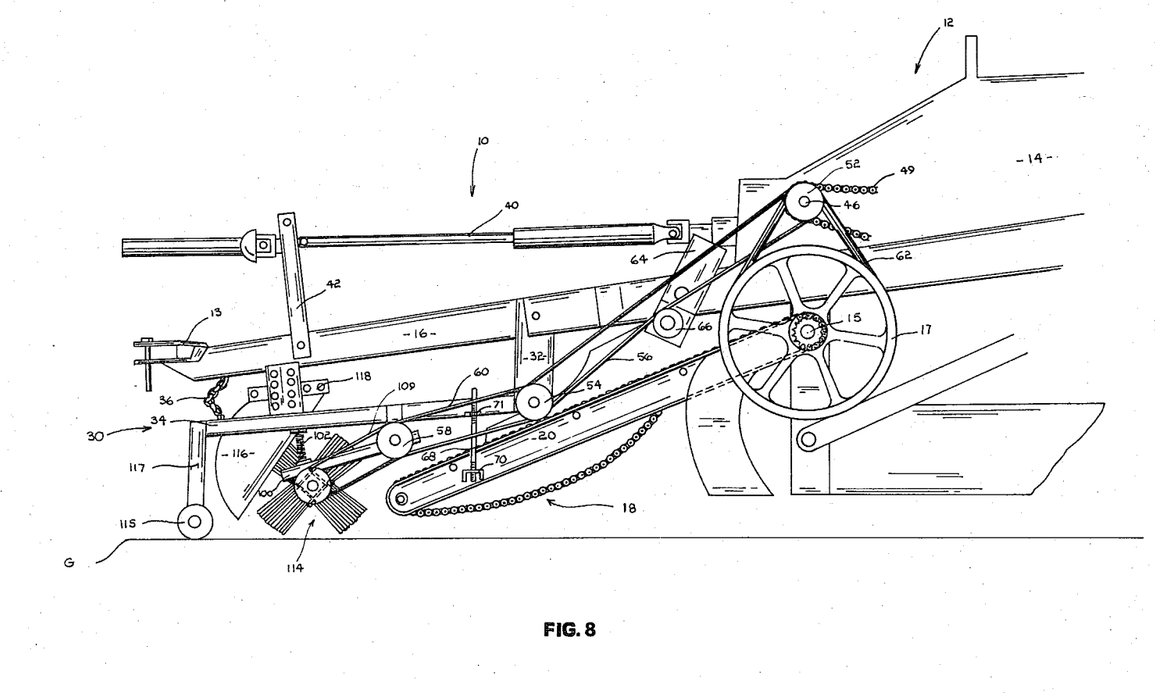
FIG. 8 is a side elevational view of the basic convertible header provided with a rotary brush assembly and associated hood for above ground salvaging.
Figure 9:
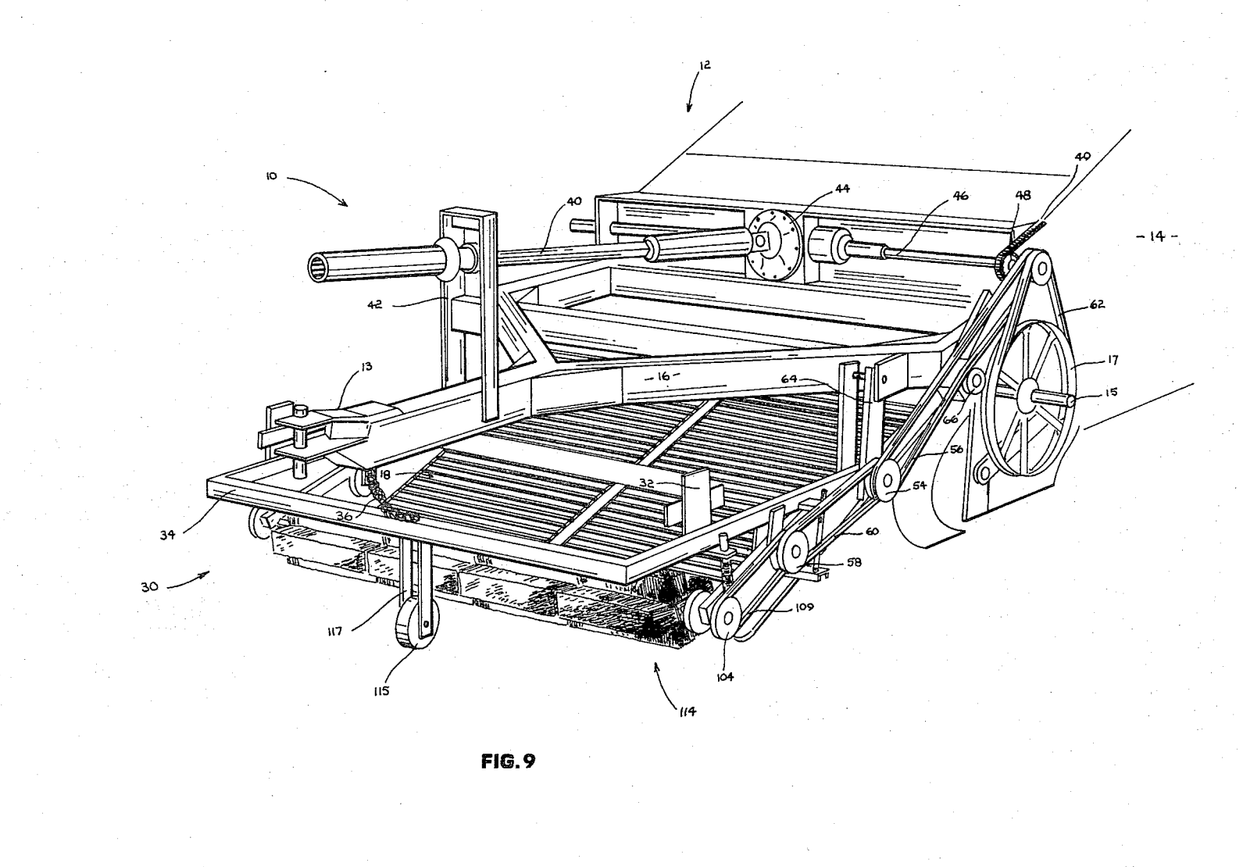
FIG. 9 is a front perspective view of the same basic convertible header as shown in FIG. 8 with the hood removed.

Next, with reference to FIGS. 7-9, a number of above ground salvaging embodiments are shown. In particularly, FIG. 7 shows a rotary type salvaging assembly which basically comprises a plurality of tines 112 secured to the basic reel structure 101 of the above ground harvesting embodiment shown in FIGS. 3 and 4. The tines 112 are preferably detachably secured by suitable means to the paddle members 107 of the basic reel used in above ground harvesting. It will be particularly observed from FIG. 7 that the tine assembly and basic reel structure is spaced forwardly of the front terminal end of the separator-conveyor 18 and particularly disposed such that the outer tips thereof may engage the ground G and consequently the loose peanuts disposed thereon as the header and combine move through the field.

Turning to FIGS. 8 and 9, a second above ground salvaging embodiment is shown. This second above ground salvaging embodiment comprises a rotary brush assembly 114, the brush assembly being rotatively mounted about a transverse axis within the header 10 and spaced just forwardly of the separator-conveyor 18 and particularly adapted to engage the ground and sweep the peanuts lying thereon up onto the separator-conveyor 18. As in the case of the rotary tine salvaging attachment of FIG. 7, the rotary brush assembly 114 preferably comprises a plurality of brush assemblies detachably secured to the paddle members 107 of the basic reel structure shown in the above ground harvesting operation (FIGS. 3 and 4).

In all of the above ground salvaging embodiments (FIGS. 7-9) a front ground engaging wheel 115 is rotatively mounted to a wheel support arm 117 that is fixed to the yoke 34 of the subframe 30. The presence of the wheel 115 enables the particular salvaging unit employed to be properly stationed relative to the ground G in order that the salvaging unit may efficiently engage and sweep the loose peanuts into the header.

The rotary tine and brush assemblies of FIGS. 7-9 may be driven counterclockwise relative to the header 10 as oriented in the drawings of FIG. 7. When driven counterclockwise, the tines or brushes engage the ground and tend to sweep the peanuts that are loosely disposed on the ground up onto the separator-conveyor 18. In some particular situations, it may be desirable to drive the rotary tine or brush assemblies clockwise (as viewed in FIG. 7). To accomplish this, the intermediate drive belt 56 is simply twisted, and consequently the final direction of the drive is reversed. When the rotary tine assembly and the rotary brush assembly of the above ground salvaging embodiments are driven clockwise, as viewed in FIG. 7, it is desirable to place a hood 116 transversely over the forward and upper portions of the rotary assemblies. As shown in the drawings, the subframe 30 is provided with an adjustable mounting structure 118 for securing the hood 116 generally between the forward projecting yoke 35. Thus, when driving the rotary tine or brush assemblies in the clockwise direction, the presents of the hood 116 acts to guide the peanuts being engaged by the rotary assembly toward the rear of the header, wherein the peanuts fall onto the separator-conveyor 18.

In view of the above, it is seen from FIGS. 3-9 that the header 10 of the present invention is convertible to either harvest peanuts above the ground or to salvage peanuts that have become separated from the peanut plant and are disposed loosely on the ground. In particularly, it is observed that the present invention provides for both above ground and underground salvaging and that either type can be readily performed by simply converting the basic ground harvesting embodiment of FIGS. 3 and 4.

Figure 2:
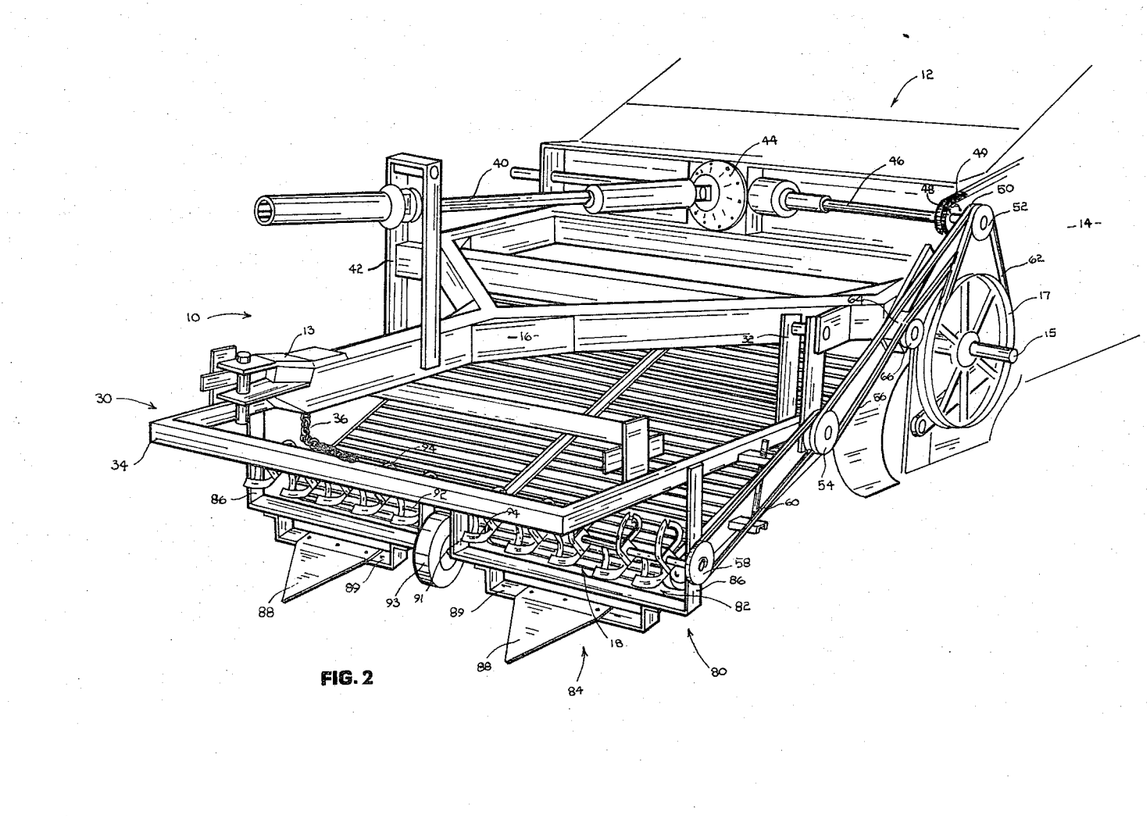
FIG. 2 is a front perspective view of the direct underground harvesting header shown in FIG. 1.

Turning to FIGS. 1 and 2, the header 10 is provided with a direct underground peanut harvesting attachment. The attachment shown therein is particularly adapted to remove a top layer of soil from the ground and to convey the layer of soil with the peanuts contained therein onto the separator-conveyor 18, which functions to separate the peanuts from the layer soil. In particular, the direct underground harvesting attachment (FIGS. 1 and 2) comprises a frame indicated generally by the numeral 80 which carries a transverse rotary agitation assembly 82 and a blade assembly 84. With particular reference to the frame 80, it is observed that a pair of arms 86 are secured about their upper ends to the subframe 30 and extend generally downwardly therefrom where the lower ends thereof turn inwardly and extend toward the inner portion of the header 10. The lower portion of the frame 80 includes a wheel housing 91 which has a ground engaging depth wheel 93 rotatively mounted therein, as best seen in FIG. 2. The lower portions of the frame 80 further include a pair of spaced apart digging spades 88 which are secured to the frame and project generally downwardly and forwardly therefrom. The spades 88 are bolted onto a blade bar 89 that is in turn disposed about the lower portion of the frame 80, as best seen in FIG. 2. The portions of the blade bar 89 extending outwardly from each spade 88 also serves a digging function as they slightly penetrate the soil adjacent the spades. Thus, the layer of soil removed by this particular blade arrangement is thicker (approximately 5 to 6 inches) in the center than along the sides (approximately 2 inches) which assures that substantially all of the peanuts will be removed since those peanuts in the center of the row are normally disposed at a greater depth than those peanuts lying just outwardly of the center of the row. The net effect of the frame 80 and the digging spades 88 is that in the case of a two-row header, as shown in the present disclosure, two layers of soil and the peanuts contained therein are peeled from the ground and conveyed up onto the separator-conveyor 18. As the layers of soil are disposed on the separator-conveyor 18, the movement of the chains 24 and rods 26 thereof cause the soil to generally separate from the peanuts and fall therethrough back onto the ground, leaving the peanuts to be conveyed from the separator-conveyor 18.

In order to facilitate the separation of the peanuts from the soil, an agitating assembly 82 is disposed transversely of the header and is particularly disposed generally above and between the digging spades 88 and the front terminal edge of the separator-conveyor 18. The agitating assembly 82 includes a plurality of agitating elements 94 extending therefrom, the agitating elements being particularly spaced on the rotary shaft 92 in off set relationship such that a set of agitating elements is disposed in alignment with each row of peanuts being removed from the ground. As each individual layer of soil is removed from the ground and rides up its respective spade 88, the agitating elements 94, being powered by belt 60, sheave 58 and shaft 92, consequently move through the layer of soil in an agitating manner, thereby tending to loosen and break the soil from the peanuts.

The direct underground harvesting attachment of FIGS. 1 and 2 is particularly adapted to harvest peanuts directly from the ground where the above ground crop material has been previously cut (by a conventional mower or mower-conditioner) and harvested (by baling, for example) from the ground. Therefore, during the underground harvesting operation, the peanut combine does not have to perform the function of thrashing to separate the peanuts from the above ground crop material, but only has to separate the peanuts from what roots and other underground debris that might be attached to the peanuts. In many cases, the peanuts will be completely free and not even be attached to the roots, thus, only requiring the peanuts to be separated from the layer of soil removed.

The cutting of the above ground crop material before underground harvesting greatly simplifies the total thrashing operation because it is clear that in the past the principle and most difficult harvesting operation involved the thrashing of the above ground crop material to remove such from the peanuts. Therefore, the process of pre-harvesting the above ground peanut crop material and then harvesting the peanuts directly underground greatly simplifies the total harvesting operation. Moreover, this method of harvesting is more efficient than the conventional method inasmuch as the peanuts are not subjected to rainy and humid weather above ground, and are not encountered by an above ground harvesting system which inherently causes peanuts to be separated and lost during above ground harvesting.

From the above, it is obvious that the present invention has the advantage of providing a highly efficient header for peanut combine that is relatively simple and inexpensive to manufacture and yet is highly efficient in operation. The device also has the advantage of being inexpensive to maintain and operate. A further advantage of the present invention is to provide a method whereby peanuts can be more easily and completely harvested than heretofore has been thought possible.

The terms "upper," "lower," "forward," "rearward," etc., have been used herein merely for the convenience of the foregoing specification and in the appended claims to describe the combination harvesting and salvaging header for peanut combines and its parts as oriented in the drawings. It is to be understood, however, that these terms are in no way limiting to the invention since the combination harvesting and salvaging header for peanut combines may obviously be disposed in many different positions when in actual use.

The present invention, of course, may be carried out in other specific ways than those herein set forth without departing from the spirit and essential characteristics of the invention. The present embodiments are, therefore, to be considered in all respects as illustrative and not restrictive, and all changes coming within the meaning and equivalency range are intended to be embraced herein.

What is claimed is:

1. A combination harvesting and salvaging header for peanut combines adaptable to either perform an above ground harvesting operation or a salvaging operation wherein the loose peanuts lost during above ground harvesting are gathered, said header comprising: a main frame means operatively connected to said combine and extending generally forwardly therefrom; conveyor means disposed within said header and operatively associated with said combine for transferring peanuts and peanut crop material into said combine; an above ground harvesting mechanism mounted within said main frame and having driven rotary means rotatively mounted about a transverse axis within said main frame and disposed adjacent said conveyor means for engaging and guiding peanut crop material onto said conveyor means, said rotary means including a central shaft and a plurality of paddles circumferentially spaced around said central shaft; and a peanut salvaging attachment for modifying said header such that said header is operative to pick up and salvage loose peanuts separated and loss from from the peanut crop material during the above ground harvesting operation, said salvaging attachment being disposed transversely of said main frame and having means for moving the loose peanuts lying on the ground onto said conveyor means, said means for moving the loose peanuts lying on the ground onto said conveyor means including a plurality of ground engaging sweeping elements disposed about said central shaft.

2. A combination harvesting and salvaging header for a peanut combine, as recited in claim 1, wherein said plurality of ground engaging sweeping elements comprise a series of tines, the tines being detachably secured to said paddles surrounding said central shaft.

3. A harvesting and salvaging header for a peanut combine, as recited in claim 3, wherein said pluality of ground engaging sweeping elements comprise a brush assembly fixed to said paddles surrounding the central shaft.

4. A combination harvesting and salvaging header for a peanut combine, as recited in claim 1, wherein a hood is mounted over said plurality of ground engaging sweeping elements for guiding and directing the loose peanuts picked up thereby onto said conveyor.

* * * * *